United States Patent
Honig et al.

[11] 3,726,959
[45] Apr. 10, 1973

[54] PROCESS FOR MAKING SODIUM PERBORATE TETRAHYDRATE

[75] Inventors: Helmut Honig, Sehnde; Helmut Dillenburg, Bad Honningen; Rudolf Siegel, Niederbieber, all of Germany

[73] Assignee: Kali-Chemie Aktiengesellschaft, Hanover, Germany

[22] Filed: Jan. 28, 1971

[21] Appl. No.: 110,668

[30] Foreign Application Priority Data

Jan. 30, 1970 Germany..................P 20 04 158.1

[52] U.S. Cl..................................423/281, 252/99
[51] Int. Cl..............................................C01b 15/12
[58] Field of Search........................23/60; 423/281

[56] References Cited

UNITED STATES PATENTS

| | | | |
|---|---|---|---|
| 3,348,907 | 10/1967 | Pellens et al. | 23/60 |
| 3,131,995 | 5/1964 | Gonze et al. | 23/60 |
| 2,828,183 | 3/1958 | Alimici et al. | 23/60 |

*Primary Examiner*—Herbert T. Carter
*Attorney*—Michael S. Striker

[57] ABSTRACT

Sodium perborate tetrahydrate is made by reacting, in solution, metaborate with hydrogen peroxide. Up to the time when crystallization sets in the reaction partners being used in a stoichiometric amount or hydrogen peroxide being present in a barely stoichiometric amount or in a slight excess, the temperature of the reaction is maintained at at least 15°C and the component solutions are employed in concentrations so as to provide for formation of 90–160 g per liter of starting solution of sodium perborate tetrahydrate. Once crystallization has started, the precipitation is continued with an excess of sodium metaborate and the mass is cooled so as to cause a temperature drop. After crystallization is complete, the precipitated sodium perborate is then separated out and dried.

The product is pourable, abrasion-resistant and has a low bulk density.

8 Claims, No Drawings

PROCESS FOR MAKING SODIUM PERBORATE TETRAHYDRATE

BACKGROUND OF THE INVENTION

For the manufacture of washing powders, there is a need to have a sodium perborate which has physical properties corresponding to those of the other components of the detergent, or at least very close to such correspondence. This implies mainly the corn size and the bulk density of the sodium perborate. In addition, it is a matter of course that the sodium perborate must be abrasion-resistant so as to exclude as far as possible undesirable dust formation. The perborate, besides, must have good flow properties.

In the conventional precipitation from solutions of sodium metaborate and hydrogen peroxide, sodium perborate is obtained with a bulk density between 0.65 and 0.80 kg/l and an average grain size of about 0.3 mm. However, the components of the detergent or washing product have a slightly larger average grain size, about 0.5 mm, and a considerably lower bulk density of about 0.35 kg/l. To avoid separation of the components when packed, it is particularly important to reduce the bulk density of the sodium perborate.

Various processes have been described in the last few years methods which predominantly had the object to reduce the pour weight by a granulation operation. For instance the German published application 1,240,508 discloses a process wherein the sodium perborate granulates are formed by recrystallization and bonding together with a binder starting from a dry or slightly exteriorly dried tetrahydrate.

According to another proposition (German published application 1,275,521) the process is carried out with supersaturated solutions, partly, upon addition of dust. The granulate is then obtained by spraying of a suspension.

These processes have the shortcoming that the manufacture of the light-weight sodium perborate is substantially more expensive because of the necessary multiple operational steps and the larger apparatus cost, compared with a product which is obtained by precipitation from solutions at the conventional concentrations. Two processes have therefore been developed to make a light-weight and pourable sodium perborate by a precipitation process.

One of these processes (German patent 1,240,833) employs an excess of hydrogen peroxide during the precipitation. The other process (German patent 1,109,152) discloses a process which operates with highly supersaturated sodium perborate solutions.

Both of these processes can use a simpler type of apparatus and therefore are cost-wise more desirable compared with the granulation. In both process a light-weight and pourable product is obtained. However, the mechanical stability of this product does not meet maximum requirements since the individual grains have a lower strength and therefore are subject to be crushed during storage and particularly during shipping, resulting in a high dust formation. Besides, this type of product requires special packaging, such as hard paper drums, wooden barrels, etc., to prevent too much destruction of the grains during shipping.

It is therefore an object of the present invention to provide for a pourable abrasion-resistant sodium perborate tetrahydrate which has a low bulk density and which process avoids the shortcomings so far described.

SUMMARY OF THE INVENTION

The invention solves this problem by reacting a solution of sodium metaborate with hydrogen peroxide the reaction partners being used in a stoichiometric amount or hydrogen peroxide being present in a barely stoichiometric amount or in a slight excess and, up to the time when crystallization sets in, maintaining a temperature of the mass of at least 15°C or higher and employing the component solutions in a concentration to provide for formation of sodium perborate tetrahydrate, calculated from the sodium metaborate, in an amount of 90–160 g/l of solution. Once crystallization has started, the precipitation is then continued with an excess of sodium metaborate and the mass is subjected to cooling so as to cause a temperature drop. After completion of the crystallization, the precipitated sodium perborate is separated and subjected to drying.

DESCRIPTION OF THE INVENTION AND PREFERRED EMBODIMENTS

The process of the invention results in a sodium perborate tetrahydrate of a bulk density between 0,35 and 0,50 kg/l and an average grain diameter between 0,30 and 0,45 mm. The product has a high abrasion resistance and meets each of the requirements regarding flow properties and solubility rate.

A specific advantage of the process of the invention is its great simplicity. To make the light-weight and abrasion-resistant crystals a crystallization apparatus can be used as it is used for making conventional crystals. A sodium metaborate solution is mixed with barely or exactly the stoichiometric amount or also slight excess of hydrogen peroxide in a storing vessel which is provided with a cooling device to obtain a temperature of at least 15°C and preferably between 17° and 30°C. The components of the starting product are used in an amount to obtain a sodium perborate content, calculated as the tetrahydrate on the basis of the employed sodium metaborate, between 90 and 160 g/l and preferably between 100 and 140 g/l. The operator then waits until crystallization sets in and then immediately turns on the cooling means to effect strong cooling.

Sodium metaborate is then added during continued cooling until the necessary excess has been obtained. The amount should be preferably such that at the end of the crystallization a mole ratio of $H_2O_2 : NaBO_2$ between 0.15 : 1 and 0,35 : 1 is obtained in the reaction mass. If desired, part of the sodium metaborate excess can be eliminated by adding hydrogen peroxide at the completion of the crystallization. The crystal slurry is then separated from the mother liquor. The crystal cake is finally dried in conventional manner.

An important point for making a light-weight and nevertheless abrasion-resistant sodium perborate tetrahydrate is the molar ratio of $H_2O_2 : NaBO_3$ in the mass at the beginning of the crystallization. The bulk density of the crystals is so much lower as the excess of hydrogen peroxide is higher at the beginning of the crystallization if optimum temperature and concentration conditions are observed, that is a temperature between 15° and 30°C, and between 90 and 160 g/l of sodium perborate tetrahydrate concentration.

It has also been found that certain limits must be maintained in order to prevent the bulk density from rising too much or the abrasion resistance from becoming too low. With a molecular ratio of $H_2O_2 : NaBO_2$ below 0,90 : 1 the final crystallized product has a bulk density higher than 0.50 kg/g. At a molar ratio above 1.50 : 1 a lighter weight product is obtained with a bulk density below 0.35 kg/l. However, the mechanical strength of this product no longer meets the requirements. Therefore, a molar ratio of $H_2O_2:NaBO_2$ between 0.90:1 and 1.50:1 is advisable. The preferred ratio is between 0.95:1 and 1.3:1.

The concentration of sodium perborate tetrahydrate in the solution, calculated from sodium metaborate, at the beginning of the crystal formation likewise affects the grain properties of the formed sodium perborate. At higher sodium perborate concentrations, the bulk density will go down. At the same time there is, however, also a decrease of the abrasion resistance. At concentrations above 160 g/l the final crystallized product is sufficiently light in weight, is however too soft—that is, does not have sufficient abrasion resistance. It will be understood that concentrations below 90 g/l will be less economical and therefore of no particular interest for a workable process.

A further factor affecting the physical properties of the sodium borate is the precipitation temperature. Prior to crystal formation the temperature in the mass should be at least 15°C, and preferably between 17° and 30°C, depending on the concentration and mole relations. When crystalates of the same bulk density are compared, higher temperatures apply to lower molar ratios of $H_2O_2:NaBO_2$ and larger concentration of sodium perborate. On the other hand, with a higher mole ratio and a lower sodium perborate concentration, a lower temperature should be used.

After crystallization has started, and during the addition of sodium metaborate, a strong cooling must be effected in order to assure that the temperature goes down. Preferably, 60 percent of the released heat of crystallization should be discharged within 10-15 minutes, and at the end of the crystallization the temperature should be about 5° to 1°C. If the cooling is omitted, and the continued crystallization after commencement of the crystallization is carried out at the same initial temperature, crystals are obtained which are of light weight but have too low an abrasion resistance.

The porous crystals which form in the first place in the presence of a comparatively large hydrogen peroxide amount affect the crystal formation so that agglomerates form which are similar in their structure to the porous starting crystals. These agglomerates have the desired mechanical stability since they have grown or matured at a low temperature and while there was an excess of sodium metaborate in the reaction mass.

It is advisable to filter the crystal mash in a vacuum on a tape filter. After suction the filter cake contains between 20 and 35 percent of the adsorbed mother liquor, depending on the process conditions. This residual mother liquid is removed by conventional drying, preferably in a fluidizing bed. The drying at low temperature for a more extended period of time is preferable to drying at higher temperatures for a shorter period of time. Drying temperatures should be between 40° and 60°C and preferably between 40° and 50°C. It will be understood that during the crystallization of the sodium perborate, stabilizers for the hydrogen peroxide such as water glass and magnesium compounds may be added.

A specific advantage of the sodium perborate tetrahydrate made by the process of the invention is that in spite of its low bulk density it has a comparatively high abrasion resistance. The abrasion resistance can be determined as follows.

A specimen of a light-weight sodium perborate which had been obtained by screening on a DIN (German Industrial Norm) 30 Sieve is treated for 15 minutes in a cylinder which is half filled with lead balls of 5 mm diameter and which rotates at 145 RPM. Subsequently the material is again filtered. The percentage fraction with a diameter below 0,053 mm is considered the abrasion fraction.

The sodium perborate made by the process of the invention, according to this test, has an abrasion of 4-6 percent, as distinguished from a granulated product which is made by means of binders and which has an abrasion between 20 and 25 percent. The sodium perborate which is made by spraying a suspension of sodium perborate crystals has an abrasion of about 10 percent which, accordingly, is still higher than the product obtained by the process of the invention. Even a conventionally formed sodium perborate which has a bulk density of 0.65 to 0.80 kg/l has still an abrasion resistance between 2 and 4 percent.

Sodium perborate, however, must not only have a high abrasion resistance but must not cake together upon storing. The storing properties can for instance be tested as follows:

A test amount of the product was introduced into a matrix composed of separable parts. The matrix was then exposed to 40°C for 100 hours and to a pressure of 2 $kp/cm^2$ in an air-conditioned chamber. The matrix was then opened and, if a test product had formed, a cube was cut out therefrom to determine at what weight load it would break.

If the load necessary to break the pressed product is in excess of 1 $kp/cm^2$, poor storage properties of the sodium perborate may be expected. Below 1 $kp/cm^2$ and with decreasing load, steadily better storing properties can be expected. The sodium perborate made by the process of the invention, after heat and pressure treatment, can be charged with a load of about 0.1 $kp/cm^2$.

It is furthermore necessary that the flow properties of the sodium perborate remain intact in spite of its reduced pour weight. This can be established as follows:

The sodium perborate to be tested in an amount of 250 g is passed through a round funnel which is provided with an outlet opening that can be closed and which has an upper diameter of 18 cm, an outlet diameter of 1.6 cm, a flow length of 16 cm, and whose sides are at an angle of 60°, and have a height of 15 cm. The pour property was determined as the time in seconds which the sodium perborate requires to completely drain out of the funnel.

The sodium perborate of the invention, depending on the bulk density, has a drainage time between 4 and 10 seconds. While it is true that a conventionally made sodium perborate with a higher bulk density, because of its smoother surface, drains in about 4 to 6 seconds, the drainage speed of the product made by the granulation process which has the same bulk density and an average grain diameter like the products of the invention is in excess of 10 seconds.

The following examples will further illustrate the invention.

EXAMPLE 1

905 l of water, 153 l of sodium peroxide with an $H_2O_2$ content of 192 g/l, and 262 l of sodium metaborate solution with a content of 209 g/l of $NaBO_2$ were combined in a stirring vessel of stainless steel which had a useful capacity of 1.5 m³ and was provided with a cooling jacket and a cooling coil (total cooling surface about 10 m²). The mass was maintained at a temperature of 25°C. The sodium perborate tetrahydrate concentration after mixing amounted to 97 g/l, calculated from the content of sodium metaborate, and the mole ratio between $H_2O_2$ and $NaBO_2$ was 1.04 : 1. Upon starting of the crystallization, the temperature of the mass was brought down to 19°C within 4 minutes by turning on the cooling apparatus. The temperature of the cooling brine was −15°C. Sodium metaborate solution with a content of 192 g/l was then added while continuing the cooling and until, at the end of the crystallization, a mole ratio of $H_2O_2:NaBO_2$ of 0.27 : 1 was obtained. The temperature in the mass was 1°C.

Thereafter, 57 l of a saturated sodium chloride solution was added in order to reduce the solubility of the sodium perborate in the crystal solution.

After separating the crystals on a tape filter with a filter surface of 1.3 m² in a vacuum of 220 mm Hg, there were present in the filter cake 28 percent of adsorbed or entrapped mother liquor. The drying was carried out in a fluidizing bed at a dry air temperature of 40°–50C. There were obtained 120 kg sodium perborate with a bulk density of 0.42 kg/l and an average grain diameter of 0.4 mm. The abrasion was 4.0 percent, the flow time was 8 seconds. The active oxygen content was 10.40 percent.

EXAMPLE 2

The same process was employed as in Example 1 with the exception of the following specification modified conditions:

There were used 839 l water and 219 l hydrogen peroxide with a content of 192 g/l so as to obtain a molar ratio of $H_2O_2:NaBO_2$ of 1.49 : 1. The temperature prior to the start of the crystallization was 22°C. At the end of the crystallization the molar ratio of $H_2O_2:NaBO_2$ was 0.20 : 1.

The sodium perborate crystals thus formed had a bulk density of 0.39 kg/l and an abrasion of 6 percent. The active oxygen content was 10.44 percent.

EXAMPLE 3

178 l hydrogen peroxide with an $H_2O_2$ content of 192 g/l and 253 l metaborate solution with a sodium metaborate content of 209 g/l were combined with 875 l of perborate mother liquor with a content of 5 g/l of sodium perborate tetrahydrate by stirring. A molar ratio of $H_2O_2 : NaBO_2$ of 1,24 : 1 was thus established. The temperature of the mass was maintained at 17°C. The sodium perborate concentration in the mass was 98 g/l.

Upon starting of the crystallization, the mass was cooled to 14°C within 4 minutes and additional metaborate solution was added. 1,5 l of saturated magnesium sulfate solution was at the same time added during the crystallization in order to stabilize the hydrogen peroxide. The obtained sodium perborate tetrahydrate which was separated and dried as described in Example 1 had a bulk density of 0,46 kg/l and an abrasion of 4 percent. The active oxygen content was 10,44 percent.

EXAMPLE 4

The same conditions were again observed as in Example 1, with the following exceptions. The amount of water added was 427 l, and the sodium perborate concentration prior to crystallization therefore was 152 g/l. Furthermore, cooling prior to adding the metaborate solution was effected to 22°C within 4 minutes. The sodium perborate crystals produced had a bulk density of 0.38 kg/l and an abrasion of 6 percent. The active oxygen content was 10.46 percent.

The product obtained by the processes of Examples 2–4 was the same as that obtained by the process of Example 1 in respect of other properties such as grain size distribution and pour properties.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for making a free-flowing abrasion resistant sodium perborate tetrahydrate of a bulk density of about 0.35 to 0.50 kg per liter, the said process comprising reacting, in a first stage, a hydrogen peroxide solution and a sodium metaborate solution, in a mole ratio of $H_2O_2 : NaBO_2$ between 0.95 : 1 and 1.3 : 1 at a temperature of at least 15°C and employing the two component solutions in a concentration to provide a sodium perborate contents, figured as the sodium perborate tetrahydrate, of 90 to 160 g/l, and then, in a second stage, upon setting in of the crystallization, subjecting the mass to vigorous cooling to cause its temperature to drop below the temperature of the first stage while adding further sodium metaborate to obtain an excess thereof over the required amount and to provide for a mole ratio of $H_2O_2 : NaBO_2$, at the completion of the reaction, between 0.15 : 1 and 0.35 : 1; and finally separating and drying the precipitated sodium perborate after completion of the crystallization.

2. The process of claim 1, wherein the said concentration of component solutions in the first stage provides for a sodium perborate tetrahydrate content of 100–140 g/l.

3. The process of claim 1, wherein the temperature of the mass prior to crystallization is between 15° and 30°C.

4. The process of claim 1, wherein the cooling after beginning of the crystallization is effected to an extent to cause discharge of about 60 percent of the heat of crystallization within the time of 10–15 minutes and to cause the temperature at the end of the crystallization period to be between 1° and 5°C.

5. The process of claim 1, wherein a stabilizer for the hydrogen peroxide is added to the mass.

6. The process of claim 1, wherein the separation of the sodium perborate from the mother liquor is effected in a vacuum on a tape filter.

7. The process of claim 1, wherein the drying of the sodium perborate is effected at a temperature between 40° and 60°C.

8. The process of claim 7, wherein the said drying temperature is between 40° and 50°C.

* * * * *